(12) United States Patent
Heidrich et al.

(10) Patent No.: US 9,511,515 B2
(45) Date of Patent: Dec. 6, 2016

(54) METHOD FOR MOLDING AN OPHTHALMIC LENS

(71) Applicant: Novartis AG, Basel (CH)

(72) Inventors: Halina Heidrich, Kahl am Main (DE); Axel Heinrich, Aschaffenburg (DE); Karsten Straube, Lutherstadt Wittenberg (DE)

(73) Assignee: Novartis AG, Basel (CH)

( * ) Notice: Subject to any disclaimer, the term of this patent is extended or adjusted under 35 U.S.C. 154(b) by 850 days.

(21) Appl. No.: 13/660,078

(22) Filed: Oct. 25, 2012

(65) Prior Publication Data

US 2013/0106006 A1 May 2, 2013

Related U.S. Application Data

(60) Provisional application No. 61/552,536, filed on Oct. 28, 2011.

(51) Int. Cl.
*B29D 11/00* (2006.01)
*B29C 33/58* (2006.01)

(52) U.S. Cl.
CPC ......... *B29C 33/58* (2013.01); *B29D 11/00125* (2013.01); *B29D 11/00192* (2013.01)

(58) Field of Classification Search
None
See application file for complete search history.

(56) References Cited

U.S. PATENT DOCUMENTS

| | | | |
|---|---|---|---|
| 5,064,583 A | 11/1991 | Dagostino | |
| 5,639,510 A * | 6/1997 | Kindt-Larsen et al. | 427/133 |
| 5,849,222 A * | 12/1998 | Jen et al. | 264/2.3 |
| 2003/0052424 A1 * | 3/2003 | Turner et al. | 264/1.32 |
| 2003/0209818 A1 * | 11/2003 | Bothe et al. | 264/1.32 |

FOREIGN PATENT DOCUMENTS

| | | |
|---|---|---|
| DE | 3611730 C1 | 8/1987 |
| EP | 0686469 A2 | 12/1995 |
| EP | 0740997 A2 | 11/1996 |

(Continued)

OTHER PUBLICATIONS

PCT International Search Report dated Jan. 28, 2013, International Application No. PCT/EP2012/071173, International Filing Date Oct. 25, 2012.

(Continued)

*Primary Examiner* — Barbara J Musser
(74) *Attorney, Agent, or Firm* — Robert A. Ambrose

(57) ABSTRACT

There are described a method for applying a coating to a surface of an ophthalmic lens mold. The mold includes male and female (20) mold halves, with each of the mold halves being provided with a lens forming surface (21). The method includes applying a temporary coating to at least a portion of at least one of the male and female mold halves (20), the temporary coating being capable of reducing adhesive forces between a lens forming material and the lens forming surface (21); and drying the temporary coating applied to the portion of the lens forming surface (21). Also described is a device (1) for applying such temporary coating to the portion of the lens forming surface (21) of the ophthalmic lens mold.

12 Claims, 1 Drawing Sheet

(56) References Cited

FOREIGN PATENT DOCUMENTS

| | | |
|---|---|---|
| JP | H0857912 | 3/1996 |
| WO | 9842497 A2 | 10/1998 |
| WO | 9961217 A1 | 12/1999 |
| WO | 2008005201 A2 | 1/2008 |

OTHER PUBLICATIONS

PCT Written Opinion of the International Searching Authority dated Jan. 28, 2013, International Application No. PCT/EP2012/071173, International Filing Date Oct. 25, 2012.

* cited by examiner

METHOD FOR MOLDING AN OPHTHALMIC LENS

This application claims the benefit under 35 USC §119 (e) of U.S. provisional application Ser. No. 61/552,536 filed Oct. 28, 2011, incorporated herein by reference in its entirety.

FIELD

The present disclosure relates to a method for molding an ophthalmic lens, in particular a hard or a soft contact lens, and to a device for applying a coating to the surface of an ophthalmic lens mold, in particular to a lens mold for molding hard or soft contact lenses.

BACKGROUND

Mass production of ophthalmic lenses, in particular hard or soft contact lenses, is usually performed in a fully automated process. One example for such process described in WO 98/42497. In a preferred method of this fully automated mass production the contact lenses are manufactured with reusable molds including male and female mold halves. In one processing station a starting material, e.g. a prepolymer solution, is dispensed into the female mold halves, and the casting molds are then closed with the corresponding male mold halves. Suitable polymers formed by photochemical polymerization and/or cross-linking include polymers based on polyvinyl alcohols (PVA) or silicone hydrogels (SiHy) as well as polymers based on polyethylene glycols (PEG). To perform the photochemical polymerization and/or cross-linking, the starting material contained in the closed molds is exposed to radiation, e.g. ultraviolet radiation. After the polymerization and/or cross-linking step the molds are opened and the contact lenses so formed are removed from the male or female mold halves and transported to further processing stations.

Depending on the materials from which the lens forming surfaces of the molds are made and further depending on the materials the contact lenses are made of, the opening of the molds and the removal of the polymerized and/or cross-linked contact lenses from the male or female mold halves, respectively, may turn out to be a cumbersome task. Adhesive forces between the lens forming surfaces and the formed contact lens may require considerably high forces to allow the opening of the molds and/or to allow detachment and removal of the contact lens from the male or female mold half. Reusable casting molds are known the lens forming surfaces of which are made from highly finished glass, such as, e.g., quartz glass. In combination with specific contact lens materials, e.g. silicone hydrogels (SiHy), the high adhesive forces between the lens forming surfaces and the contact lens may result in an unacceptably high number of contact lenses getting damaged upon opening the molds, and/or upon the subsequent detachment and removal of the contact lenses from the male or female mold halves. Such damages generally render the contact lenses unable to meet the required quality standards.

In EP-0 686 469 and EP-0 740 997 it is suggested to provide an annular flange region extending about a mold surface of a mold half which may be constituted of suitable plastic materials with a thin layer or film of a polymeric surfactant. The thin layer of surfactant is supposed to facilitate removal of excess polymeric material (HEMA) which forms a ring extending externally of the mold cavity. The thin layer of surfactant is applied to the flange regions of the mold halves in a stamping station using a stamping head consisting of a plurality of stamps each of which is adapted to engage respectively a flange region extending about the mold surface. For transferring the polymer surfactant to the stamps a pad arrangement including a reservoir for the surfactant is provided. Alternatively, a brush may be provided which is adapted for contacting the flange region of a mold and which may be connected with a flexible tubing connection leading to a supply source for the surfactant (EP-0 686 469).

The application of the surfactant to the flange region of a mold assists in the separation of the male and female mold halves during opening of the plastic molds, and in addition assists in the removal of the HEMA-rings extending externally of the mold cavity of the molds. These HEMA-rings may otherwise damage the contact lens during demolding due to adhesion to the mold halves of the plastic mold.

However, depending on the lens material used the problem of detaching and removing the contact lens from the male and/or female mold half remains unsolved, particularly in cases where the molded contact lens strongly adheres to the lens forming surfaces of the male and/or female mold halves, as this is the case with contact lenses based on silicon hydrogels. As a result, considerably high forces are still required for the separation of the mold halves, that is to say for opening the mold. In addition, once the mold halves have been separated (the mold has been opened) the contact lenses continue to strongly adhere to the male mold half or to the female mold half, respectively. Moreover, application of the high forces required may result in damages to the ophthalmic lens. It is therefore and object of the present invention to overcome these problems and to provide a method and a device which reduces the considerably high forces required to open the molds and which facilitates detachment and removal of the ophthalmic lenses, e.g. the contact lenses, from the male and female mold halves of the opened lens molds. The solution to these problems shall be capable of being fully integrated in an automated mass production process for molding ophthalmic lenses, in particular soft and hard contact lenses.

SUMMARY

In accordance with the invention a method for molding an ophthalmic lens, in particular a soft or a hard contact lens, using a mold including male and female mold halves is provided. Each of the male and female mold halves is provided with a lens forming surface, with a mold cavity being formed between the lens forming surfaces of the male and female mold halves when the mold is closed. The method includes the steps of:

applying a temporary coating to at least a portion of at least one of the lens forming surfaces of the male and female mold halves, the temporary coating being capable of reducing adhesive forces between a lens forming material and the lens forming surface;

drying the temporary coating applied to the at least one portion of the at least one of the lens forming surfaces;

introducing a lens forming material into the female mold half;

assembling the male and female mold halves to close the mold;

curing the lens forming material in the mold cavity formed between the lens forming surfaces of the male and female mold halves to form the ophthalmic lens;

opening the mold; and removing the ophthalmic lens from the male mold half or from the female mold half.

By providing at least a portion of at least one of the lens forming surfaces of the male and female mold halves with a temporary coating the adhesive forces between the ophthalmic lens and the lens forming surface are considerably reduced. This facilitates both the separation of the mold halves, that is to say opening the mold, as well as the detachment and removal of the polymerized and/or cross-linked ophthalmic lens from the male or female mold halves, respectively, and helps to either completely or at least to a large extent avoid damages to the ophthalmic lens. Thus, the number of ophthalmic lenses which do not meet the required quality standards can at least be greatly reduced. The process steps of coating at least a portion of the lens forming surface(s) of the male and female mold halves and drying the applied temporary coating can be easily integrated as additional steps in a fully automated mass production of ophthalmic lenses, which can be performed before the lens forming material is dispensed into the female mold half.

In one embodiment of the method according to the invention, the temporary coating is removed from the at least one portion of the at least one lens forming surface of the male and female mold halves after having removed the ophthalmic lens from the male and female mold halves. The removal of the temporary coating may not require additional process steps or additional process time, it may be performed together with the general cleaning of the (reusable) mold halves before reusing them to form the next ophthalmic lens, e.g. contact lens. Accordingly, every contact lens is formed using a freshly coated mold or mold half so as to ensure the quality of the coating and, as a consequence, the quality of the molded ophthalmic lenses. The coating material is selected so as to be compatible with both the material of the mold halves and the lens forming material which is introduced into the female mold half after the coating and drying of the at least one lens forming surface of the male and female mold halves of a mold.

In a further embodiment of the method according to the invention the temporary coating is applied to the entire lens forming surface of at least one of the male and female mold halves. By applying the coating to the entire lens forming surface(s) of the casting mold, the adhesive forces may be reduced even further. It goes without saying that while the temporary coating may be applied to only at least a portion of one of the lens forming surfaces of the male and female mold halves, it may well be applied to at least a portion of the lens forming surfaces of both the male and female mold halves, and may also be applied to the entire lens forming surfaces of both the male and female mold halves.

In automated mass production processes for the manufacture of ophthalmic lenses, in particular soft and hard contact lenses, reusable molds may be used which include lens forming surfaces which are made of glass, such as, e.g., quartz glass. Due to the design of the mold halves, excess lens forming material may be displaced in a controlled manner to an annular space outside the mold cavity and surrounding the mold cavity as the mold halves are assembled to form a closed mold. In order to further reduce any additional adhesive forces caused by the displaced excess lens material, e.g. when opening the mold, in another embodiment of the method according to the invention the temporary coating is also applied to an annular region of the male and female mold halves outside the lens forming surface.

In an advantageous embodiment of the method according to the invention, the temporary coating may be applied in liquid form.

In a further embodiment of the method according to the invention, the liquid temporary coating is applied to the lens forming surface with the aid of a coating head capable of maintaining a continuous flow of the liquid to and from a coating face of the coating head during the application step. The continuous flow of the liquid assists in obtaining a uniform liquid coating on the lens forming surface so that there are no uncoated areas.

In a further embodiment of the method according to the invention, the liquid is applied to the lens forming surface to form a film having a thickness in the range of about 100 µm to about 200 µm. This thin film allows to obtain a smooth uniform temporary coating of the lens forming surface, this uniform film being maintained at least until after the drying step, thus resulting in a uniform smooth coating of the coated portion of the lens forming surface.

Generally, the temporary coating can be selected taking the properties of the lens forming material and the material of the lens forming surfaces of the mold halves into account. However, in one particular embodiment of the method according to the invention the temporary coating is selected from the group consisting of polyvinylalcohol and copolymers of vinylalcohole; polyvinylpyrrolidone (e.g. Kollidon® from BASF); copolymers of N-vinylpyrrolidone with e.g. vinylacetate (Luviskole® from BASF), polytetrahydrofurane, polyethylene glycols, polypropylene glycols, copolymers of polyethylene glycols with polypropylene glycols (e.g. Pluronics® or Tetronics® from BASF), polyacrylamide and copolymers thereof, e.g. with acrylic acid; poly(vinylpyridine) and copolymers thereof.

While drying of the applied temporary coating may be performed in various manners, in one embodiment of the method according to the invention the step of drying the temporary coating is performed using infrared radiation which is a fast and convenient way for drying the applied temporary coating.

As already mentioned, the removal of the temporary coating after the ophthalmic lens has been detached and removed from the male and female mold halves can be accomplished during the regular course of cleaning the mold halves. Accordingly, in one embodiment of the method according to the invention the step of removing the temporary coating is performed by exposing the respective coated lens forming surface to a rinsing liquid, such as, e.g., water, water with additives and solvents.

While the method according to the invention is generally applicable in connection with many contact lens forming materials, in one embodiment of the invention the lens forming material is selected from the group consisting of polymers based on polyvinyl alcohols (PVA), silicone hydrogels (SiHy), and polyethylene glycols (PEG). In particular the silicone hydrogel (SiHy) materials—while having advantageous lens properties—tend to generate considerably high adhesive forces, so that the method according to the invention is particularly suitable for these materials.

Another aspect of the invention relates to a device for applying a coating to a surface of an ophthalmic lens mold, in particular a lens mold for molding hard or soft contact lenses. The lens mold includes male and female mold halves, each of the male and female mold halves being provided with a lens forming surface, with a mold cavity being formed between the lens forming surfaces of the male and female mold halves when the mold is closed. The device includes at least one coating head having a coating face adapted to be contacted with the portion of the at least one lens forming surface of the male and female mold halves. The coating head is provided with feed and discharge ports adapted to be connected with feed and discharge lines in order to allow for a continuous flow of a temporary coating substance to and from the coating face at least during contact of the coating face with the portion of the lens forming surface of the at least one of the male and female mold halves.

The coating head, by allowing for a continuous flow of the temporary coating substance to at least a portion of the lens forming surface, enables the deposition of a uniform film of the temporary coating substance, typically a liquid, on the lens forming surface so that there are no uncoated areas. The film typically has a thickness in the range of about 100 µm to about 200 µm. This thin film allows to obtain a smooth uniform temporary coating of the lens forming surface, the uniform film being maintained at least until after the drying step, thus resulting in a uniform smooth coating of the coated portion of the lens forming surface.

In one embodiment of the device according to the invention, the coating face includes a curved outer surface generally matching a concave or convex curvature of the lens forming surface of the male or female mold half, respectively.

In another embodiment of the device according to the invention, the coating face includes a mesh which is made of a material selected from the group consisting of polyethylene, polypropylene, polytetrafluoroethylene, polyamide, polyester, silk, steel, and combinations of these materials. The materials for the mesh are selected such that they do not cause damage to the lens forming surface(s) as they contact the lens forming surface(s).

In a further embodiment of the device according to the invention, the mesh has a mesh size of about 25 µm to about 1 mm. The mesh size is selected such that it may be penetrated by the liquid coating substance and that it enhances a uniform distribution thereof across the mesh and, as a consequence, across the contacted lens forming surface. At the same time, the mesh size is selected to allow an easy cleaning of the mesh after application of the liquid coating substance to the lens forming surface.

In a further embodiment of the device according to the invention, the mesh is provided with projections protruding from the coating face and having a length in the range of about 50 µm to about 2 mm. The protrusions result in a certain minimum distance of the rest of the mesh from the lens forming surface to be coated and, together with the distance between adjacent protrusions, they allow removal of the coating head from the lens forming surface once the film has been uniformly applied to the lens forming surface without breaking of the film due to adhesion forces.

In a still further embodiment of the device according to the invention, the coating head further includes a homogenizer arranged upstream of the mesh. The homogenizer further improves an even distribution of the coating substance subsequently applied through the mesh. By way of example, the homogenizer may include one or more ceramic tiles.

A still further embodiment of the device according to the invention includes two coating heads, each one of the coating heads having a coating face, with the coating face of one of the two coating heads being adapted to apply a temporary coating to at least a portion of the lens forming surface of the male mold half and the coating face of the other of the two coating heads being adapted to apply a temporary coating to at least a portion of the lens forming surface of the female mold half. It is immediately evident, that this embodiment is particularly suitable to simultaneously apply a coating to the lens forming surfaces of both the male and female mold halves of a mold.

It is to be understood that in automated productions lines for the mass production of ophthalmic lenses, in particular soft or hard contact lenses, a larger number of casting molds may be arranged in side by side configuration, in order to simultaneously manufacture a plurality of lenses at a time. Thus, a corresponding number of devices for applying a temporary coating to the lens forming surfaces of the female and/or male mold halves, respectively, may likewise be arranged in side by side configuration.

BRIEF DESCRIPTION OF THE DRAWINGS

The afore-mentioned advantages of the invention will become apparent from the following description of an exemplary embodiment of the invention. The embodiment described is not intended to limit the invention to the embodiment. In particular, the embodiment described below is related to the manufacturing of contact lenses, which is by way of example only. In the following description, reference is made to the schematic drawings which are not to scale, in which.

DETAILED DESCRIPTION OF EMBODIMENTS

Figures 1, 2:
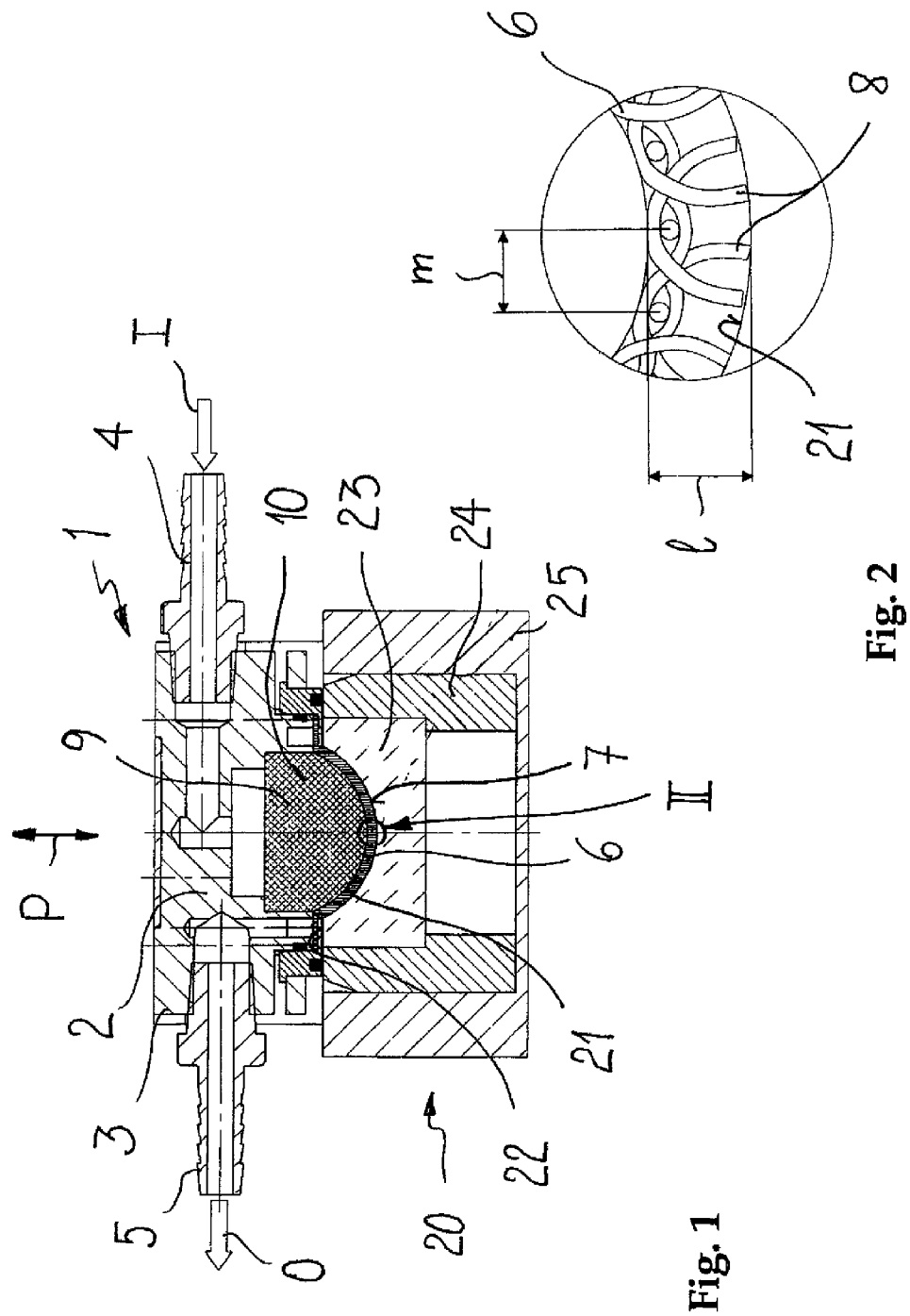
FIG. 1 shows a sectional view of a device for applying a temporary coating to a lens forming surface of a female mold half.
FIG. 2 shows the detail II of FIG. 1 at a larger scale.

In FIG. 1 a device for applying a temporary coating to a lens forming surface of a mold half is generally designated with reference numeral 1. More specifically, the device shown in FIG. 1 includes a coating head 2 which is in contact with a lens forming surface 21 of a female mold half 20 of a contact lens mold. The lens forming surface 21 of the female mold half 20 is of generally concave shape and is embodied as an insert 23 which can be made of glass, e.g. BK7 or quartz-glass, the insert 23 being arranged in a mount 24 which can be made of metal, for example. A support 25 houses mount 24 with the insert 23 arranged therein. The lens forming surface 21 of female mold half 20 is surrounded by an annular flange region 22.

Coating head 2 includes a housing 3 provided with feed and discharge ports 4, 5 adapted to be connected with tubular lines. The coating head 2 may be attached to a means (not shown) for moving the coating head 2 towards and away from the female mold half 20, this being indicated by the double arrow P. In a space 9 inside the housing 3 a homogenizer 10 is arranged, which may include one or more ceramic tiles. The device further includes a mesh 6 mounted to the housing on that side of coating head 2 facing female mold half 20. The mesh 6 can be made of polyethylene, polypropylene, polytetrafluoroethylene, polyamide, polyester, silk, steel, and the like. The front side of the mesh 6, i.e. that side of the mesh facing lens forming surface 21 of female mold half 20, represents a coating face 7 which, in use, contacts the lens forming surface 21 of the female mold half 20. The coating face 7 has a curvature which is generally complementary to the curvature of lens forming surface 21. In the embodiment shown the coating face 7 is of convex shape and curvature in order to match the concave-shaped lens forming surface 21 of the female mold half 20. It goes without saying, that in order to apply a temporary coating to a male mold half having a convex-shaped lens forming surface the coating head will be provided with a coating face of concave shape and matching curvature.

FIG. 2 shows the encircled detail II of FIG. 1 at a larger scale. From FIG. 2 it becomes clear that the mesh 6 is a network having a mesh size m which may be in the range of about 25 µm to about 1 mm. The mesh is provided with projections 8 protruding from the coating face 7. These projections 8 may a length l in the range of about 50 μm to about 2 mm. In use, the projections 8 contact the lens forming surface 21 of the female mold half 20 so that the coating face 7 is arranged at a distance from the lens forming surface 21.

The device for applying a temporary coating to a lens forming surface of a mold half may be integrated into an automated productions line for contact lenses, upstream of a processing station, in which the casting molds are filled with a lens forming material, such as polymers based on polyvinyl alcohols (PVA), silicone hydrogels (SiHy), and polyethylene glycols (PEG). Flexible tubular lines may be connected with the feed and discharge ports 4, 5 in order to supply a coating liquid to the coating head 2. The coating liquid may be polyvinylalcohol and copolymers of vinylalcohol; polyvinylpyrrolidone (e.g. Kollidon® from BASF); copolymers of N-vinylpyrrolidone with e.g. vinylacetate (Luviskole® from BASF), polytetrahydrofurane, polyethylene glycols, polypropylene glycols, copolymers of polyethylene glycols with polypropylene glycols (e.g. Pluronics® or Tetronics® from BASF), polyacrylamide and copolymers thereof, e.g. with acrylic acid; poly(vinylpyridine) and copolymers thereof. The coating liquid enters the coating head 2 via feed port 4, as indicated in FIG. 1 by the arrow I, and is evenly distributed by flowing through the homogenizer 10 before it reaches the mesh 6. The mesh size m allows the coating liquid to penetrate the mesh 6 and reach the coating face 7. The effect of the projections 8 is that the rest of the mesh 6 is arranged at a distance from the lens forming surface 21. This distance depends on the length of the projections 8. The coating liquid is applied to the lens forming surface 21 of the female mold half through the mesh 6 and between projections 8. The projections 8 serve to reduce adhesive forces that occur as the coating head 2 is moved away from the coated lens forming surface 21 surface in order to prevent a break of the liquid film. In this manner, a smooth uniform film of a liquid coating substance can be applied to the lens forming surface 21. This film may have a thickness which may be in the range of about 100 μm to about 200 μm and is maintained until it is subsequently dried, e.g. with the aid of infrared (IR) radiation so as to form a temporary coating on the lens forming surface 21 of the female mold half. Optionally, the temporary coating may be applied to the annular region 22 as well, but this is not provided for in the embodiment described.

During application of the liquid coating substance, the liquid coating substance is continuously transported through coating head 2. It exits coating head 2 through discharge port 5 as indicated in FIG. 1 by arrow O, so that during application of the liquid coating substance there is a continuous flow of liquid over the lens forming surface 21. Once application of the liquid coating substance is completed and the film is properly formed on the lens forming surface 21, the coating head 2 is moved away from lens forming surface 21 and the liquid film on lens forming surface 21 is dried by subjecting the liquid film on lens forming surface 21 to infrared radiation. The temporary coating of lens forming surface is then completed. The female mold half 20 may then be filled with the lens forming material, and the mold may then be closed by assembling the male and female mold halves to form a mold cavity between the lens forming surfaces of the male and female mold halves, the mold cavity determining the shape of the contact lens to be manufactured. During closing of the mold with the aid of the male mold half, any excess lens forming material may be displaced into an annular space formed by the annular regions of the male and female mold halves. The lens forming material inside the mold cavity may then be polymerized and/or cross-linked e.g. by irradiation with ultraviolet radiation, as this is known in the art. When the mold is closed the annular space may be in communication with the mold cavity so that in case shrinkage occurs during polymerization and/or cross-linking of the lens forming material contained in the mold cavity additional material may flow from the annular space into the mold cavity so as to compensate for that shrinkage.

Once polymerization and/or cross-linking has been completed, the mold halves are separated from one another, that is to say the mold is opened, and the so formed contact lens is removed from the male mold half or from the female mold half, respectively, for further processing. The contact lens molds are then cleaned so as to be reused after cleaning. During this ordinary cleaning of the mold halves which is usually performed using water as a rinsing liquid, the temporary coating is also removed from the lens forming surface 21. Alternatively, other rinsing liquids such as water with additives and solvents and the like may be used. Thus, the removal of the temporary coating does not require an additional process step but may be performed together with the ordinary process of cleaning the mold halves. After cleaning, the mold halves may be used again to form the next contact lens in the automated lens production process.

In the embodiment, coating of the entire lens forming surface of a female mold half has been described. It is to be noted though, that the lens forming surface does not necessarily have to be entirely coated. In certain instances it may be sufficient to apply the temporary coating only to a part of the lens forming surface. Also, while it has been described that the temporary coating is applied to the female mold half, the temporary coating can alternatively be applied to the male mold half, and in particular to both the male and female mold halves of a mold. As already indicated, the temporary coating may in addition be provided to the annular region surrounding the lens forming surface of the male and/or female mold half, respectively.

The invention claimed is:

1. A method for molding an ophthalmic lens using a mold comprising male and female mold halves, each of said male and female mold halves being provided with a lens forming surface, with a mold cavity being formed between said lens forming surfaces of said male and female mold halves when the mold is closed, the method including the steps of:
   applying a temporary coating to at least a portion of at least one of said lens forming surfaces of said male and female mold halves, said temporary coating being capable of reducing adhesive forces between a lens forming material and said lens forming surface; and wherein said temporary coating is applied to said lens forming surface with the aid of a coating head capable of maintaining a continuous flow of said liquid to and from a coating face of said coating head during the application step;
   drying said temporary coating applied to said at least one portion of said at least one of said lens forming surfaces;
   introducing a lens forming material into said female mold half;
   assembling the male and female mold halves to close the mold;
   curing said lens forming material in said mold cavity formed between said lens forming surfaces of said male and female mold halves to form said ophthalmic lens;
   opening said mold; and
   removing said ophthalmic lens from said male mold half or from said female mold half.

2. The method according to claim 1, further comprising the step of
removing said temporary coating from said at least one portion of said at least one of said lens forming surfaces after having removed said ophthalmic lens from said male and female mold halves.

3. The method according to claim 1, wherein said temporary coating is applied to the entire lens forming surface of at least one of said male and female mold halves.

4. The method according to claim 1, wherein said temporary coating is also applied to an annular region of said male and female mold halves outside said lens forming surface.

5. The method according to claim 2, wherein said temporary coating is also applied to an annular region of said male and female mold halves outside said lens forming surface.

6. The method according to claim 1, wherein said temporary coating is applied in liquid form.

7. The method according to claim 6, wherein said liquid is applied to said lens forming surface to form a film having a thickness in the range of about 100 μm to about 200 μm.

8. The method according to claim 1, wherein said temporary coating is selected from the group consisting of polyvinylalcohol and copolymers of vinylalcohol; polyvinylpyrrolidone; copolymers of N-vinylpyrrolidone with vinylacetate, polytetrahydrofurane, polyethylene glycols, polypropylene glycols, copolymers of polyethylene glycols with polypropylene glycols, polyacrylamide and copolymers thereof with acrylic acid; poly(vinylpyridine) and copolymers thereof.

9. The method according to claim 2, wherein said temporary coating is selected from the group consisting of polyvinylalcohol and copolymers of vinylalcohol; polyvinylpyrrolidone; copolymers of N-vinylpyrrolidone with vinylacetate, polytetrahydrofurane, polyethylene glycols, polypropylene glycols, copolymers of polyethylene glycols with polypropylene glycols, polyacrylamide and copolymers thereof with acrylic acid; poly(vinylpyridine) and copolymers thereof.

10. The method according to claim 1, wherein said step of drying said temporary coating is performed using infrared radiation.

11. The method according to claim 2, wherein said step of removing said temporary coating is performed by exposing said respective coated lens forming surface to a rinsing liquid.

12. The method according to claim 1, wherein said lens forming material is selected from the group consisting of polymers based on polyvinyl alcohols (PVA), silicone hydrogels (SiHy), and polyethylene glycols (PEG).

* * * * *